United States Patent
Yabe (10) Patent No.: US 8,625,166 B2
(45) Date of Patent: Jan. 7, 2014

(54) IMAGE PROCESSING METHOD AND APPARATUS UTILIZING HALFTONE PROCESSING AND TEST PATCH

(75) Inventor: Takashi Yabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 207 days.

(21) Appl. No.: 13/097,706

(22) Filed: Apr. 29, 2011

(65) Prior Publication Data

US 2011/0286047 A1 Nov. 24, 2011

(30) Foreign Application Priority Data

May 18, 2010 (JP) .................................. 2010-114518

(51) Int. Cl.
*G06T 5/00* (2006.01)
*G06K 15/00* (2006.01)
*H04N 1/40* (2006.01)

(52) U.S. Cl.
USPC ......................... 358/3.26; 358/3.06; 358/3.23

(58) Field of Classification Search
None
See application file for complete search history.

(56) References Cited

U.S. PATENT DOCUMENTS

| 5,768,410 | A | 6/1998 | Ohta et al. |
| 5,907,415 | A | 5/1999 | Yabe |
| 6,023,344 | A | 2/2000 | Yabe |
| 6,359,703 | B1 | 3/2002 | Yabe |
| 7,251,422 | B2 | 7/2007 | Tokuyama et al. |
| 7,289,294 | B2 | 10/2007 | Lee et al. |
| 2008/0088862 | A1 | 4/2008 | Harashima et al. |
| 2008/0246982 | A1* | 10/2008 | Kaneko et al. ................. 358/1.9 |
| 2009/0109509 | A1 | 4/2009 | Yabe |
| 2010/0053646 | A1 | 3/2010 | Shishikura et al. |
| 2011/0141525 | A1* | 6/2011 | Ng et al. ....................... 358/3.06 |

FOREIGN PATENT DOCUMENTS

| CN | 1673889 A | 9/2005 |
| CN | 101166222 A | 4/2008 |
| JP | 2004-240112 A | 8/2004 |
| JP | 2004-355798 A | 12/2004 |
| JP | 2007-208639 A | 8/2007 |
| JP | 2010-054577 A | 3/2010 |

OTHER PUBLICATIONS

Chinese Official Action dated Jul. 24, 2013 in counterpart Chinese Application 201110129497.3.

* cited by examiner

*Primary Examiner* — Barbara Reinier
(74) *Attorney, Agent, or Firm* — Fitzpatrick, Cella, Harper & Scinto (57) ABSTRACT

Upon setting of a halftone process of an initial setting, there is such a problem that graininess deteriorates due to an aging change or an environmental change. To solve this problem, an image processing apparatus executes a halftone process on a test image for tone correction and prints the processed test image; forms a tone correction table in accordance with read values from the printed test image; obtains graininess from a read value of a low density portion of a tone correction patch of the test image for the tone correction; discriminates whether the obtained graininess exceeds a predetermined reference level; and changes a setting of the halftone process so as to reduce the graininess when it is discriminated that the obtained graininess exceeds the predetermined reference level.

9 Claims, 13 Drawing Sheets

| | CYAN | | MAGENTA | | YELLOW | | BLACK | |
|---|---|---|---|---|---|---|---|---|
| | THE NUMBER OF LINES | ANGLE | THE NUMBER OF LINES | ANGLE | THE NUMBER OF LINES | ANGLE | THE NUMBER OF LINES | ANGLE |
| SETTING 1 | 168 | 33.7 | 166 | 56.3 | 240 | 0.0 | 169.7 | 135.0 |
| SETTING 2 | 190 | 108.4 | 190 | 71.6 | ED | – | 212 | 45.0 |
| SETTING 3 | 223 | 68.2 | 223 | 111.8 | ED | – | 212 | 45.0 |
| SETTING 4 | 268 | 27.0 | 268 | 63.0 | 200 | 0.0 | 212 | 45.0 |
| SETTING 5 | 291 | 76.0 | 291 | 14.0 | 283 | 135.0 | 283 | 45.0 |

FIG. 18

| FLOW POSITION | MEMORY | SET VALUE |
|---|---|---|
| 204 | INITIAL SETTING, USED IN THE ACTUAL PRINT | MULTIVALUE ERROR DIFFUSION |
| 212 | FOR THE NEXT AUTO TONE CORRECTION | BINARY ERROR DIFFUSION |
| | FOR THE NEXT AUTO TONE CORRECTION | BINARY ERROR DIFFUSION |
| 214 | INITIAL SETTING, USED IN THE ACTUAL PRINT | BINARY ERROR DIFFUSION |

FIG. 19

IMAGE PROCESSING METHOD AND APPARATUS UTILIZING HALFTONE PROCESSING AND TEST PATCH

BACKGROUND OF THE INVENTION

1. Field of the Invention

The present invention relates to an image processing apparatus and an image processing method for reading a patch for tone correction printed by the image processing apparatus and controlling a halftone process in the image processing apparatus in accordance with a result of the reading so as to reduce graininess.

2. Description of the Related Art

In recent years, there is a case where in a screen (parameter for a halftone process) which has been set as a default into an image processing apparatus, a deterioration of graininess becomes conspicuous in association with an aging change or an environmental change and the user calls a service person. In such a case, the service person prints an image sample by the image processing apparatus, confirms the image sample by visual inspection, and if necessary, changes the screen to the screen (parameter for the halftone process) in which the graininess decreases in a service mode of the image processing apparatus.

That is, the service person manually sets the screen setting in which the graininess is small among a plurality of screen settings prepared in the image processing apparatus, thereby coping with such a situation.

Japanese Patent Application Laid-Open No. 2007-208639 discloses a point that graininess is improved in the image processing apparatus.

Japanese Patent Application Laid-Open No. 2004-240112 discloses a point that a focusing situation of an exposure image forming system in an output is discriminated from graininess of an output image and a focus of the exposure image forming system is adjusted based on a result of the discrimination.

As for the graininess, the graininess is corrected through visual inspection of the user or service person in the present situation. That is, in the present situation, if the user or service person is not aware of deterioration in graininess in the image processing apparatus, he cannot change the screen. Since the graininess deteriorates gradually, it is not easy to know a degree of deterioration in graininess as compared with an initial setting and it is difficult to be aware of the graininess deterioration.

According to Japanese Patent Application Laid-Open No. 2007-208639, the graininess is obtained and a screen coefficient in the image processing apparatus is changed. However, when the screen coefficient is changed, the tone differs delicately depending on the screen. Therefore, it is necessary that the sample image is printed by the image processing apparatus by using the changed screen, the tone in the printed image is evaluated, and the tone correction is made again. When the service person changes the screen, it is changed to a screen which is not used so far in the image processing apparatus. Therefore, since the foregoing tone correction has to be also made again, it is troublesome. Naturally, if the screen is manually changed, it is troublesome for the user or service person, a machine stops for such a period of time, and productivity also deteriorates.

SUMMARY OF THE INVENTION

It is, therefore, an object of the invention to solve the foregoing problems.

The present invention provides an image processing apparatus that: executes a halftone process on a test image for tone correction and prints the processed test image; forms a tone correction table in accordance with read values from the printed test image; obtains graininess from a read value of a low density portion of a tone correction patch of the test image for the tone correction; discriminates whether the obtained graininess exceeds a predetermined reference level; and changes a setting of the halftone process so as to reduce the graininess when it is discriminated that the obtained graininess exceeds the predetermined reference level.

Further features of the present invention will become apparent from the following description of exemplary embodiments with reference to the attached drawings.

DESCRIPTION OF THE EMBODIMENTS

Figure 1:
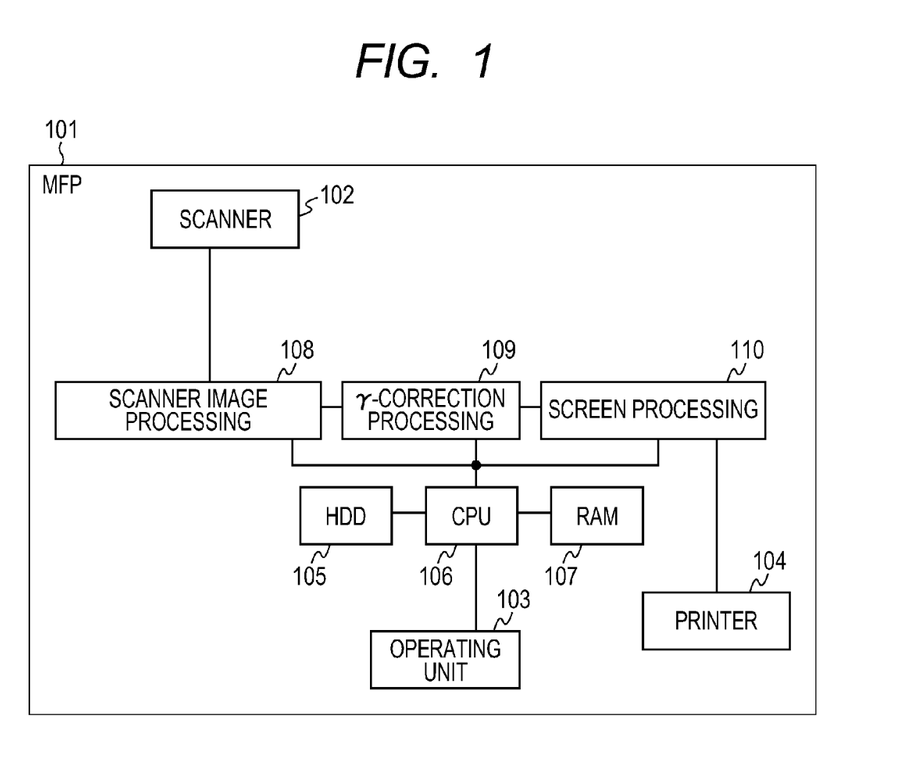
FIG. 1 is a block diagram of an image processing apparatus which is used in an embodiment of the invention.

FIG. 1 illustrates a block diagram of an image processing apparatus which is used in an embodiment of the invention. A multifunction peripheral 101 (hereinbelow, abbreviated to "MFP 101") is illustrated as an example of the image processing apparatus. The MFP 101 has: a scanner unit 102 for reading an image; an operating unit 103 for operating the MFP 101; a printer unit 104 for executing a printing; an HDD 105 for storing various kinds of data; a RAM 107; a CPU 106 for controlling processes of the MFP; a scanner image processing unit 108 for processing the image read by the scanner unit 102; a γ-correction processing unit 109 for executing a γ-correction process to the image processed by the scanner image processing unit 108; and a screen processing unit 110 for executing a screen process to the image processed by the γ-correction processing unit 109.

First Embodiment

The first embodiment will be described hereinbelow with reference to the block diagram of FIG. 1 and a flowchart of FIG. 2.

First, a flow for a process of an automatic tone correction in a set of image forming screens (halftone process/error diffusion) in color (in this instance, cyan, magenta, yellow, and black) will be described.

Figure 2:
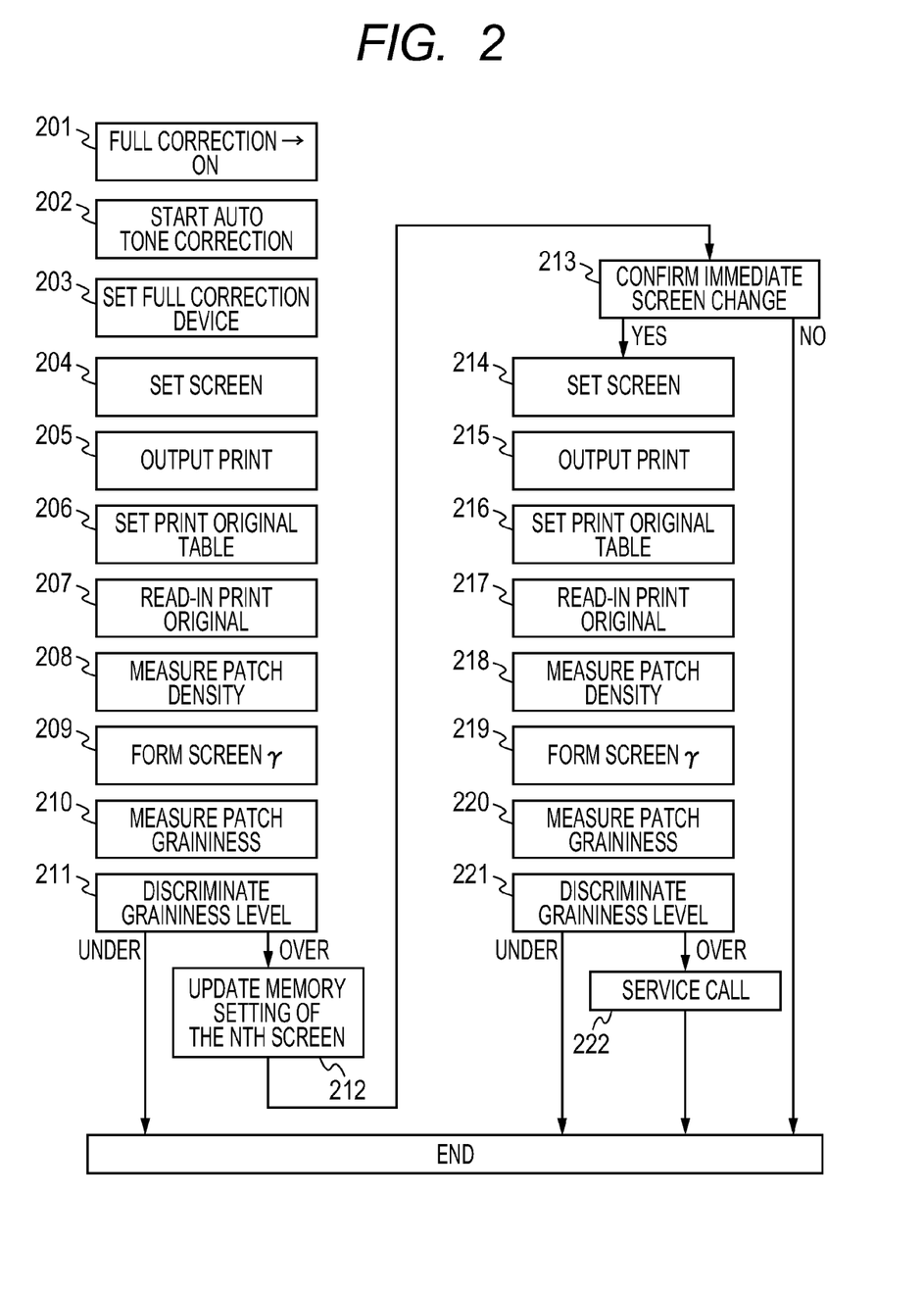
FIG. 2 is a flowchart for an auto tone correcting process in the first embodiment.
Figure 3:
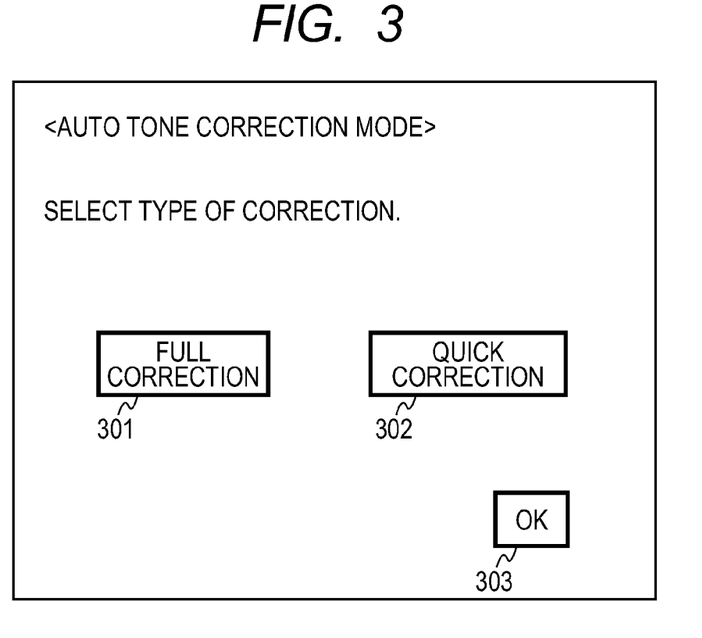
FIG. 3 is an operation display screen of an operating unit in the first embodiment.
Figure 4:
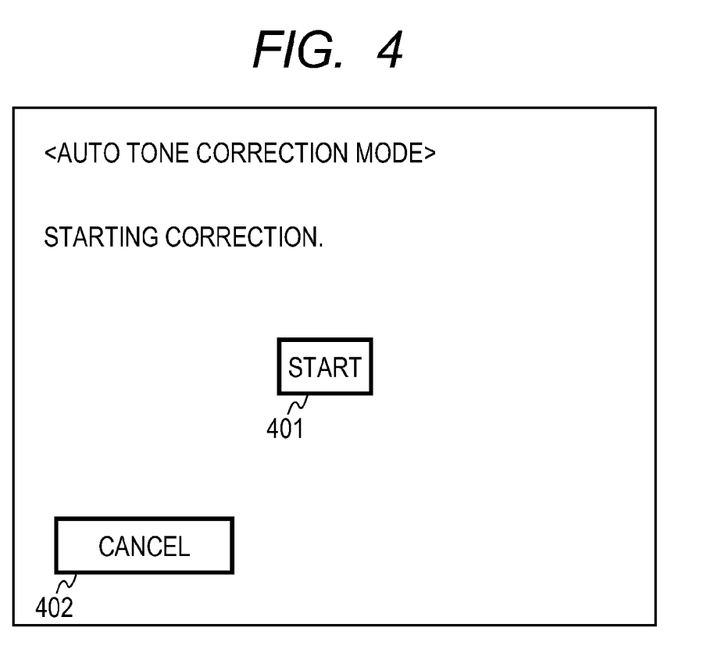
FIG. 4 is an operation display screen of the operating unit in the first embodiment.

First, the user operates the operating unit 103 of the MFP 101 in FIG. 1 so as to display a display screen for an auto tone correction mode illustrated in FIG. 3. When it is confirmed in step 201 in FIG. 2 that the user selected a full correction button 301 in FIG. 3 and pressed an OK button 303, the operating unit 103 displays a display screen for starting the auto tone correction mode in FIG. 4. When a start button 401 in FIG. 4 is pressed, an auto tone correcting process in step 202 in FIG. 2 is started.

Figure 5:
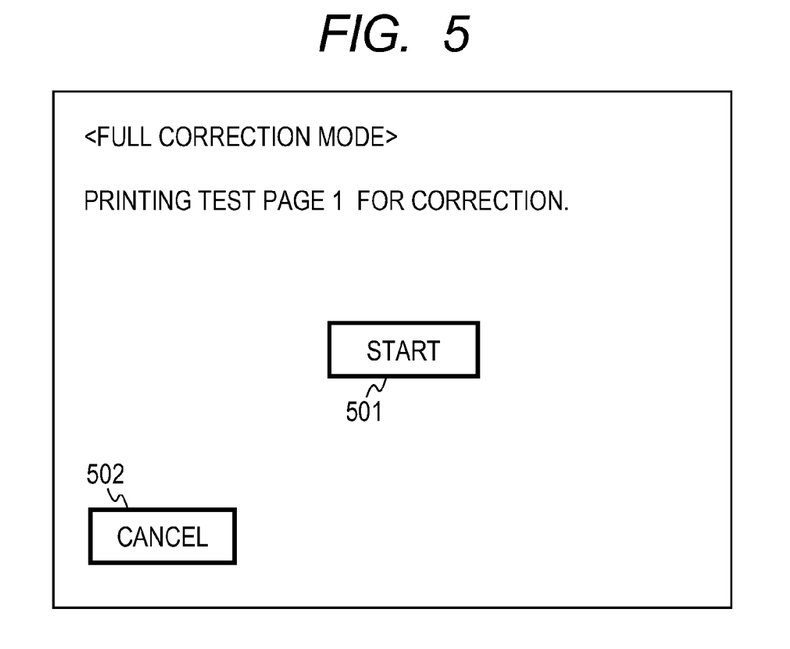
FIG. 5 is an operation display screen of the operating unit in the first embodiment.
Figure 6:
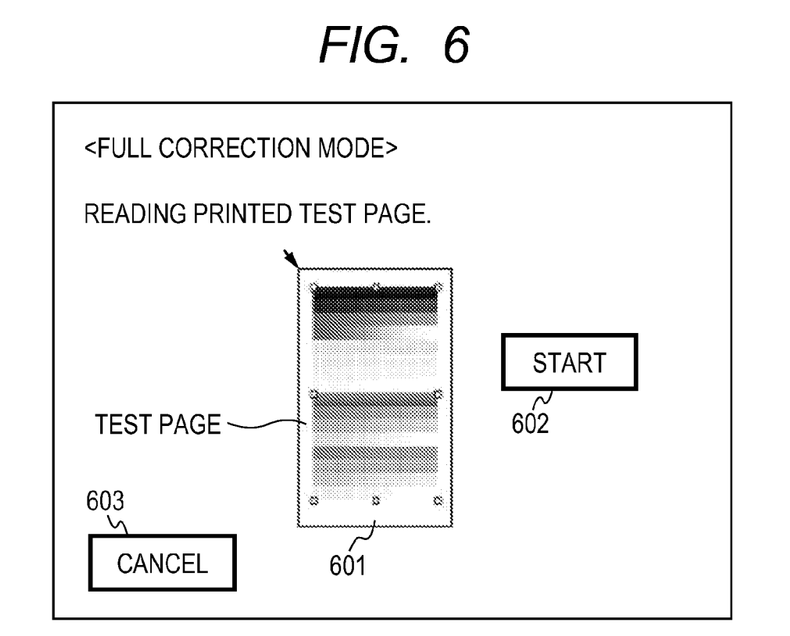
FIG. 6 is an operation display screen of the operating unit in the first embodiment.

In the auto tone correcting process, first, various kinds of setting control of the printer unit 104 such as process control of devices and the like is made in step 203 in FIG. 2. Subsequently, the processing routine advances to step 204 and a setting of a screen (halftone process/error diffusion) which is used to output a print for copying is made. Specifically speaking, an error diffusion 0 of the screen setting which has been stored in the RAM 107 and is used here is set into the screen processing (halftone process) unit 110 by the CPU 106 in FIG. 1. Since the auto tone correction is made, "through" is preset into the γ-correction processing unit 109. After completion of those setting processes, a print display screen of a test page in FIG. 5 is displayed. When a print start button 501 is pressed here, the processing routine advances to step 205 in FIG. 2 and a print output is performed. A test page image (601 in FIG. 6) which is used here has been stored in the HDD 105 or RAM 107 in FIG. 1. Under control of the CPU 106, a γ-correction process (through/input is output as it is) and the foregoing screen process are executed to the test page image and a test print is output by the printer unit 104. When the test print is output, an operating unit display screen for reading the test page in FIG. 6 is displayed. The user watches this display screen, sets the test page into the scanner unit 102 of the MFP 101, closes a pressing plate, a document feeder, and the like, and fixes the test page (206 in FIG. 2). When the user presses a read-in start button 602 in FIG. 6, the read-in of the test page is started in step 207 in FIG. 2.

Figure 8:
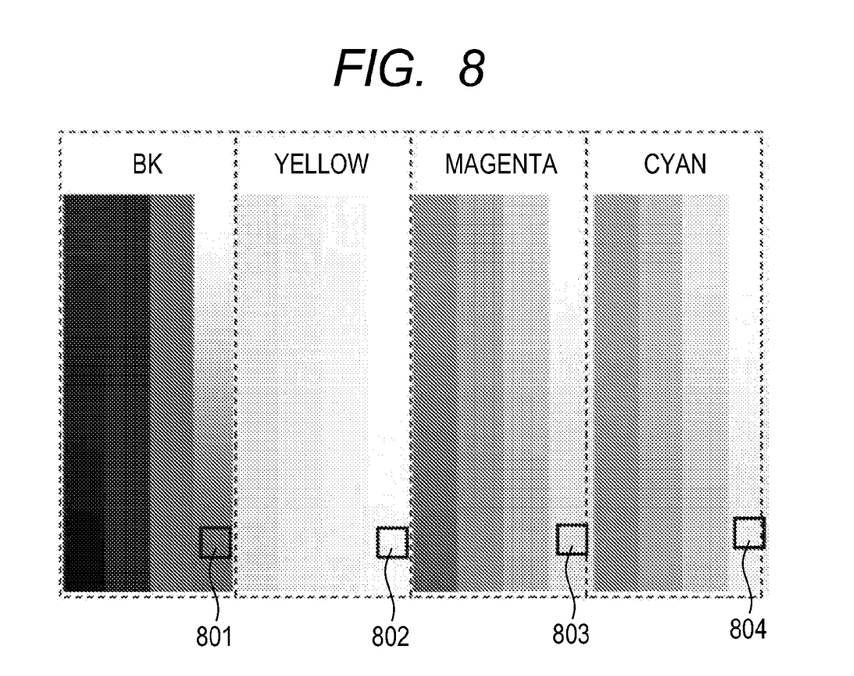
FIG. 8 is a tone correction patch in the first embodiment.

The test page is read by the scanner unit 102 in FIG. 1 and stored as (digital) test data into the RAM 107 or HDD 105. A patch density of each patch in the test data is measured by using the stored test data in order to measure the tone of the test page to which the process by the set screen for the auto tone correction has been performed. An example of a tone correction patch is illustrated in FIG. 8. After each density of the patch was measured, a correction γ for converting each patch density measurement result into a target tone is formed so as to obtain a predetermined target tone and stored into the RAM 107. After that, until the next auto tone correction is made, when printing, the correction γ is set into the γ-correction processing unit 109, the image data processed by the scanner image processing unit 108 is processed and output to the screen processing unit 110 (step 209).

According to the auto tone correction in the related art, the processing routine is finished by the processes mentioned above. However, in the first embodiment, the following processes are subsequently executed.

First, graininess of the patch is measured in step 210. Specifically speaking, in the digital data of the test page stored in the RAM 107 or HDD 105 by the patch reading for the tone correction, graininess in a patch portion of a low density suitable to measure a predetermined graininess surrounded by a square illustrated in FIG. 8 is measured. For example, among continuous tone of levels 0 to 255, it is sufficient to measure the graininess from any one of the patches of the levels 32 to 64 (patches of the densities in a range from ¼ to ⅛ of the whole density range). In order to describe the color here, graininess is measured in each of the colors of black 801, yellow 802, magenta 803, and cyan 804. Naturally, the color which is measured is variable in accordance with the color of toner or ink which is used here. As disclosed in Japanese Patent Application Laid-Open No. 2004-240112, the graininess can be obtained by calculating a standard deviation performed by using FFT (Fast Fourier Transform) and a VTF (Visual Transfer Function) filter of human visual characteristics. The larger the graininess is, the larger the standard deviation is. Naturally, the invention is not limited to the foregoing method but any method may be used so long as the graininess can be obtained.

Figure 9:
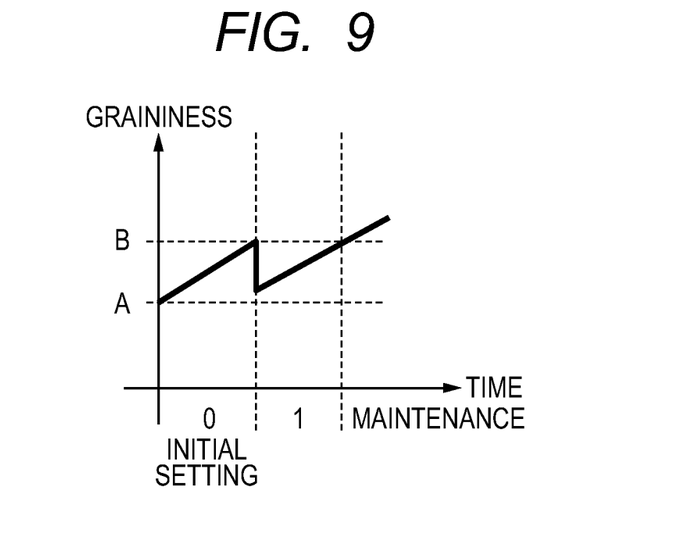
FIG. 9 is a diagram for discriminating graininess in the first embodiment.

Subsequently, the graininess level in step 211 is discriminated by using the graininess obtained in step 210. Specifically speaking, whether or not the graininess exceeds a predetermined reference level B at the error diffusion setting 0 serving as an initial halftone processing parameter as illustrated in FIG. 9 is discriminated. If it does not exceed the level B as a result of the discrimination, the processing routine is finished. If it exceeds the level B, in step 212, a memory setting of the screen which has been preset is updated to a screen setting of an error diffusion 2 serving as a halftone processing parameter in which the graininess decreases. The processing routine advances to step 213.

Now, the screen may be updated in step 212 in accordance with the read-in graininess in each color of cyan, magenta, yellow, and black, or it is also possible to calculate an average of the granularities of all of the colors and update the screen on the basis of the obtained average value. Since yellow is difficult to be recognized, it is also possible to construct in such a manner that the graininess regarding yellow is not referred to but the discrimination about the graininess is made on the basis of the average of the granularities of the other colors. Furthermore, as for yellow, it is desirable to determine the graininess by using the colors such as cyan, magenta, and the like other than black, because yellow and these colors have the similar characteristics as color toner. Since black is frequently used in the monochromatic printing and is liable to deteriorate, it is desirable that the screen for the halftone process of black is determined based on the graininess of black. As for the screens of cyan, magenta, and yellow, the patches of small densities of cyan and magenta may be representatively used or the graininess may be determined by the average value of the granularities of the patches of small densities of cyan and magenta. With respect to the screens whose granularities are similar, they may be substituted by the screen of a similar color.

Figure 7:
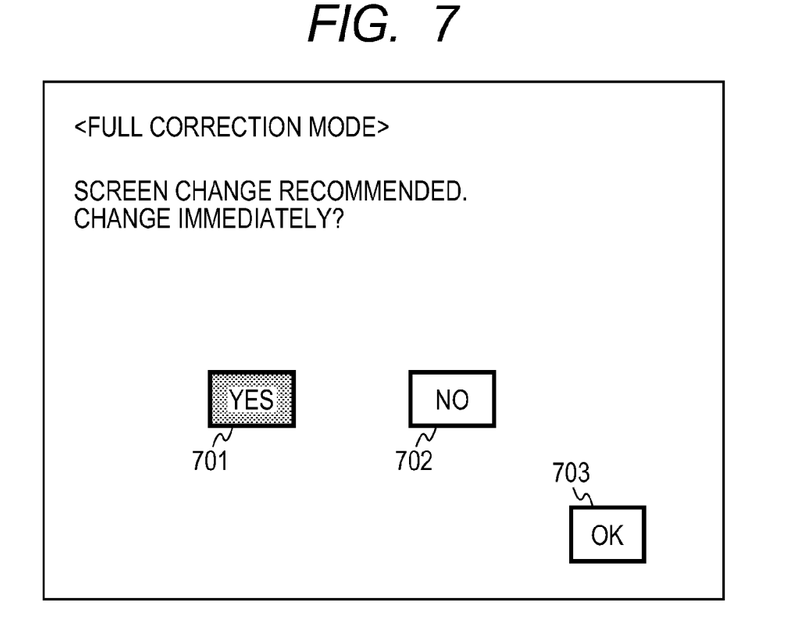
FIG. 7 is an operation display screen of the operating unit in the first embodiment.

In step 213 in FIG. 2, whether or not the user desires to update the screen immediately is confirmed by an operation display screen of FIG. 7. If a "NO" button 702 is pressed, the processing routine is finished as it is. If a "YES" button 701 is pressed, the processing routine advances to step 214. The screen setting serving as a halftone processing parameter updated in step 212 has been stored in the RAM 107 and the following processes are executed by using the screen setting.

As mentioned above, the error diffusion 2 is set as a screen setting serving as a halftone processing parameter which is used here.

Although the processes of subsequent steps 215 to 221 are executed by using the screen setting set in step 214, since their processing contents are similar to those of steps 205 to 211, their description is omitted here. In step 221, it is discriminated whether or not the graininess of the patch of the low density of the test print which was output with the screen process using the error diffusion setting 2 as illustrated in FIG. 9 exceeds the predetermined reference level B. If it does not exceed the level B, the processing routine is finished. If it exceeds the level B, this means that in spite of a fact that the memory setting of the screen serving as a halftone processing parameter has been updated in step 212, it is determined that the graininess is small. Since it is considered that there is an abnormality in the printer, the MFP 101 calls the service person through a network I/F (interface) (not shown) in step 222. A UI (user interface) for promoting the user to call the service person may be displayed.

As an example of the error diffusion setting, if a multilevel error diffusion is used as an error diffusion 0 which has been set as an initial value and a binary error diffusion is used as an error diffusion 2 which is subsequently set, an engine which becomes difficult to reproduce dots because the reproduction of the dots became unstable in the case of the multivalue can stably reproduce the dots by a binary value. The graininess decreases and picture quality is improved.

Figure 10:
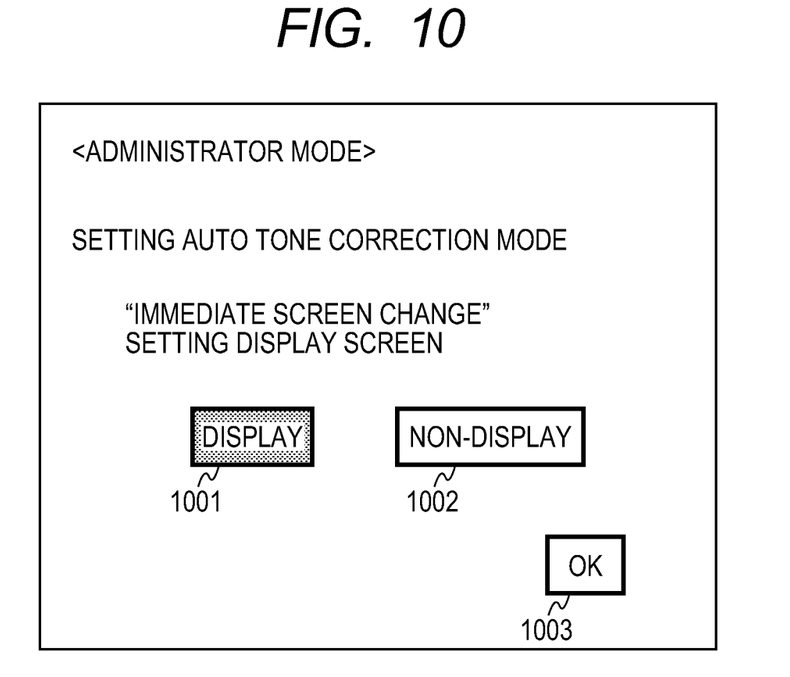
FIG. 10 is an operation display screen of the operating unit in the first embodiment.

In the above description, the system asks the user about whether or not he immediately updates the screen as a halftone processing parameter. However, if the screen as a halftone processing parameter is immediately updated, the auto tone correction is made twice, so that it takes a long time. Therefore, as a service mode, as illustrated in FIG. 10, "display" and "non-display" of an immediate screen change setting display screen illustrated in FIG. 7 may be switched. That is, if the user sets a "non-display" mode by selecting a non-display button 1002 and pressing an OK button 1003, the halftone processing parameter is not immediately changed but the screen can be automatically changed at the time of the next auto tone correction at a predetermined period (every predetermined number of print outputs, a temperature/humidity change amount is equal to or larger than a predetermined value) while the user is not aware of it. Since the screen has been updated in step 212 in FIG. 2, in the screen setting in next step 214, the updated screen is used from that point of time and the graininess can be reduced more than the graininess before that. In this case, the test page image is not read by the scanner unit 102 but, in place of it, the test page image is read on the way of a conveyance before the sheet discharge of a printed matter of the printer 104 by a measuring device (not shown) arranged on a conveyance path of the printed matter in the printer 104.

Figure 18:
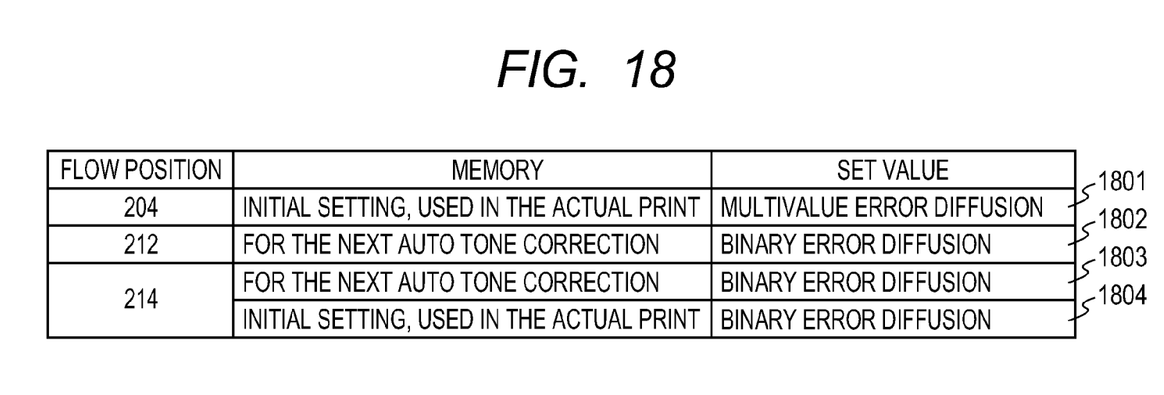
FIG. 18 is a diagram illustrating a correspondence between a memory and setting values.

The value in the memory will now be described again. There is a difference between the setting value which is set in the initial setting and actually used upon printing and the setting value which is used in the next auto tone correction. In step 204 of FIG. 2, the multilevel error diffusion, which is set in the initial setting and actually used upon printing, is set as the setting value as illustrated at 1801 in FIG. 18. In step 212 in FIG. 2, the binary error diffusion is set for the next auto tone correction as illustrated at 1802 in FIG. 18. In step 214 in FIG. 2, the binary error diffusion is set for the next auto tone correction and for the error diffusion which is actually used upon printing as illustrated at 1803 and 1804 in FIG. 18.

As described above, according to the first embodiment, merely by making the auto tone correction provided hitherto, the screen can be automatically selected in consideration of the graininess and the screen (halftone processing parameter) can be changed based on the graininess without separately executing the print output operation of the test image for the graininess.

Even if the setting adapted to automatically change the screen has been set, when the user wants to immediately change the screen, it can be changed.

Second Embodiment

Although the first embodiment has been described with respect to the case of the auto tone correction in one screen, there is such a situation that three screens such as screen for copying, screen for the large number of lines upon printing, and screen for the small number of lines upon printing are used in the image processing apparatus. That is, the error diffusion is used as a halftone process upon copying and two kinds of dithers of a high resolution and a low resolution are used upon printing.

Figure 11:
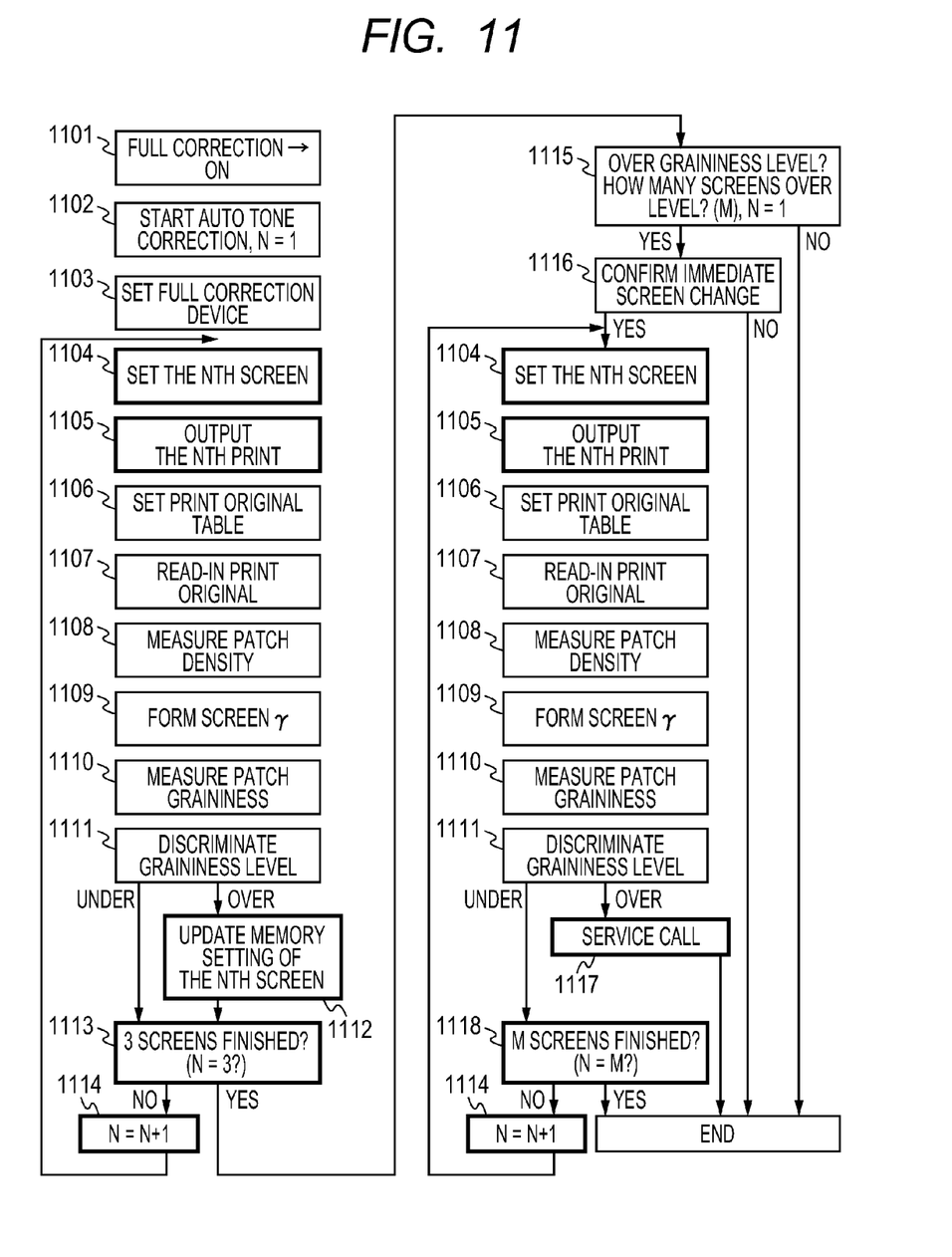
FIG. 11 is a flowchart in the second embodiment.

Therefore, the second embodiment will be described with respect to the case of the auto tone correction in three screens with reference to FIG. 11. "Printing" denotes that an image described by a Page Description Language (hereinbelow, abbreviated as "PDL") is output.

First, a flow for processes of the auto tone correction in the image creation of three sets of the error diffusion for copying, high line screen ruling upon printing, and low line screen ruling upon printing in a color (in this instance, Cyan, Magenta, Yellow, Black) will be described.

First, the user operates the operating unit 103 of the MFP 101 in FIG. 1 so as to display the display screen of the auto tone correction mode illustrated in FIG. 3. When it is confirmed in step 1101 in FIG. 11 that the user selected the full correction button 301 in FIG. 3 and pressed the OK button 303, the operating unit 103 displays the display screen for starting the auto tone correction in FIG. 4. When the start button 401 in FIG. 4 is pressed, the auto tone correcting process is started in step 1102 in FIG. 11 and an initialization of N=1 is executed.

In the auto tone correcting process, first, various kinds of setting control of the printer unit 104 such as process control of the devices and the like is made. Subsequently, step 1104 follows. When N=1, since the setting of the first screen is made, the setting of the screen (error diffusion) which is used to output the print for copying is made. Specifically speaking, in the CPU 106 n FIG. 1, the error diffusion 0 (multivalue) of the screen setting (halftone processing parameter) which is used here is set into the screen processing unit 110. Since the auto tone correction is made, "through" (the input is output as it is) is preset into the γ-correction processing unit 109. When those setting processes are finished, the print display screen of the test page in FIG. 5 is displayed. When the print start button 501 is pressed here, the processing routine advances to step 1105 in FIG. 11 and the first print of N=1 is output. The test page image (601 in FIG. 6) which is used here has been stored in the HDD 105 or RAM 107 in FIG. 1. Under control of the CPU 106, the γ-correction process (through/input is output as it is) and the foregoing set screen process are executed to the test page image and the test print is output by the printer unit 104. When the test print is output, the operating unit display screen for reading the test page in FIG. 6 is displayed. The user watches this display screen, sets the test page into the scanner unit 102 of the MFP 101, closes the pressing plate, document feeder, and the like, and fixes the test page (1106 in FIG. 11). When the user presses the read-in start button 602 in FIG. 6, the read-in of the test page is started in step 1107 in FIG. 11.

The test page is read by the scanner unit 102 in FIG. 1 and stored as (digital) test data into the RAM 107 or HDD 105. A patch density of each patch in the test data is measured by using the stored test data in order to measure the tone in the set screen for the auto tone correction. An example of the tone correction patch is illustrated in FIG. 8. After each density of the patch was measured, a correction γ for converting each patch density measurement result into a target tone is formed so as to obtain a predetermined target tone and stored into the RAM 107. After that, until the next auto tone correction is made, when printing, the correction γ is set into the γ-correction processing unit 109, the image data processed by the scanner image processing unit 108 is processed and output to the screen processing unit 110 (step 1109).

According to the auto tone correction in the related art, the processing routine is finished by the processes mentioned above. However, in the second embodiment, the following processes are subsequently executed.

First, graininess of the patch is measured in step 1110. Specifically speaking, in the digital data of the test page stored in the RAM 107 or HDD 105 by the patch reading for the tone correction, graininess in the patch portion of the low density suitable to measure a predetermined graininess surrounded by the square illustrated in FIG. 8 is measured in a manner similar to the first embodiment. In FIG. 8, since the image is printed in color, each of the colors of black 801, yellow 802, magenta 803, and cyan 804 is output for the tone correction. Although all of the colors may be measured, the graininess is measured with respect to cyan showing typical characteristics from a viewpoint of a speed and a combination of the black, yellow, magenta, and cyan screens is determined by the graininess of cyan.

Figure 12A:
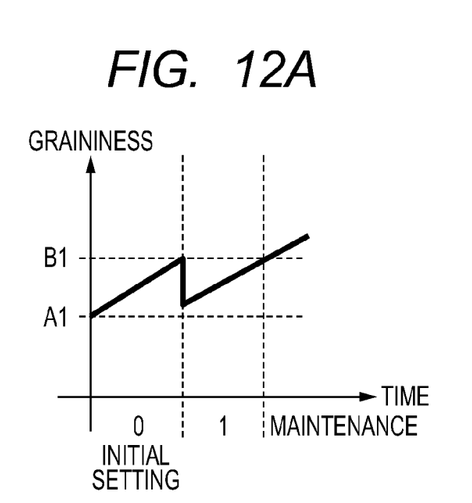
FIGS. 12A, 12B and 12C are diagrams for discriminating graininess in the second embodiment.

Subsequently, the graininess level is discriminated in step 1111 by using the graininess obtained in step 1110. Specifically speaking, whether or not the graininess exceeds a predetermined reference level B1 at the error diffusion setting 0 serving as an initial halftone processing parameter as illustrated in FIG. 12A is discriminated. If it does not exceed the level B1, since there is no problem, the processing routine advances to step 1113 as it is. If it exceeds the level B1, in step 1112, a memory setting of the first screen for copying which has been preset is changed to a screen setting of an error diffusion 1 in which the graininess decreases. In this instance, the screen settings of the respective colors of cyan, magenta, yellow, and black are updated together. When they are updated, the processing routine advances to step 1113 and whether or not three screens have been finished is confirmed. Since the screen is the first screen at this point of time (that is, NO in step 1113), step 1114 follows and a count value is incremented to N=2. In step 1104, the screen setting for the larger number of lines of the printer of the second screen is executed to the cyan, magenta, yellow, and black screens. The graininess level discrimination in step 1111 is performed in a manner similar to that described for the first screen.

Figure 12B:
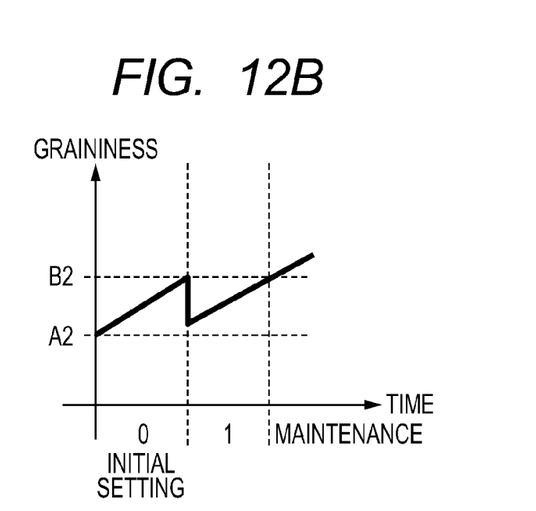
Figure 17:
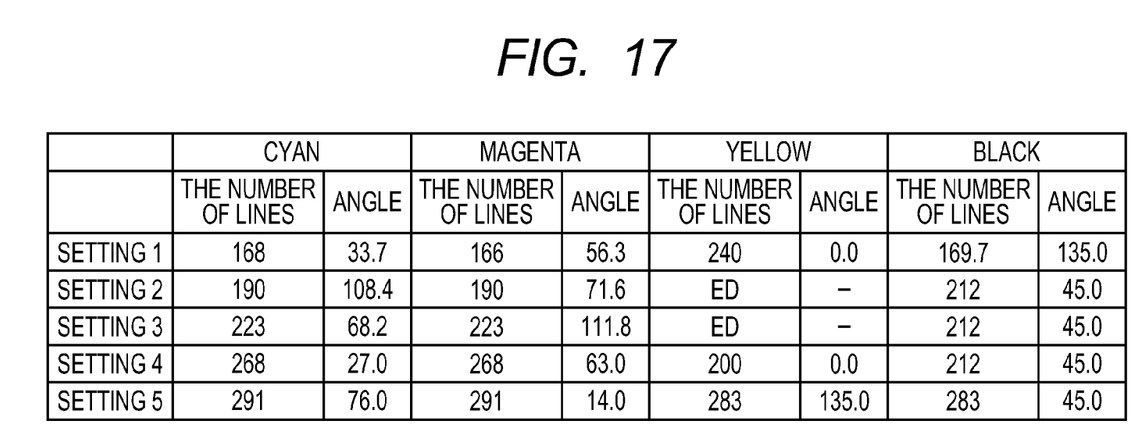
FIG. 17 is a diagram illustrating a combination of screens.

In step 1111, whether or not the graininess exceeds a predetermined reference level B2 at the screen setting 0 for the large number of lines serving as an initial halftone processing parameter as illustrated in FIG. 12B is discriminated by using the graininess obtained in step 1110. If it does not exceed the level B2, since there is no problem, step 1113 follows. If it exceeds the level B2, in step 1112, a memory setting of the second screen for the large number of lines which has been preset is changed to the screen setting of the screen setting 1 for the large number of lines serving as a halftone processing parameter in which the graininess decreases. In this instance, the screen settings of the respective colors of cyan, magenta, yellow, and black are updated together. Specifically speaking, in the screen setting 0 for the large number of lines, a combination of the screens of the respective colors of the setting 5 in FIG. 17 is used. In the screen setting 1 for the large number of lines, a combination of the screens of the respective colors of the setting 4 in FIG. 17 is used. As an initial setting, the screen setting 0 for the large number of lines is preset. When they are updated, the processing routine advances to step 1113 and whether or not three screens have been finished is confirmed. Since the screen is the second screen at this point of time (that is, NO in step 1113), step 1114 follows and a count value is incremented to N=3. In step 1104, the screen setting for the small number of lines of the printer of the third screen is executed to the cyan, magenta, yellow, and black screens. The graininess level discrimination in step 1111 is performed in a manner similar to that described for the first screen.

Figure 12C:
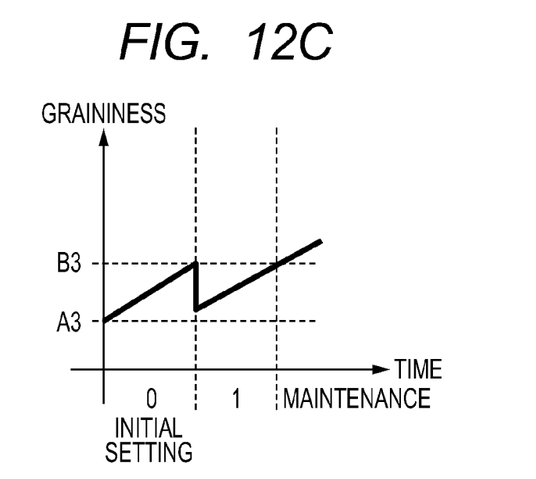

In step 1111, whether or not the graininess exceeds a predetermined reference level B3 at the screen setting 0 for the small number of lines serving as an initial halftone processing parameter as illustrated in FIG. 12C is discriminated by using the graininess obtained in step 1110. If it does not exceed the level B3, since there is no problem, step 1113 follows. If it exceeds the level B3, in step 1112, a memory setting of the third screen for the small number of lines which has been preset is changed to the screen setting of the screen setting 1 for the low number of lines serving as a halftone processing parameter in which the graininess decreases. In this instance, the screen settings of the respective colors of cyan, magenta, yellow, and black are updated together. Specifically speaking, in the screen setting 0 for the small number of lines, a combination of the screens of the respective colors of the setting 3 in FIG. 17 is used. In the screen setting 1 for the small number of lines, a combination of the screens of the respective colors of the setting 2 in FIG. 17 is used. As an initial setting, the screen setting 0 for the small number of lines is preset. When they are updated, the processing routine advances to step 1113 and whether or not three screens have been finished is confirmed. Since the three screens have been finished at this point of time, step 1115 follows and whether or not the screens over the graininess level exist is discriminated and how many screens over the graininess level is confirmed. For example, there are two screens of the first and third screens over the graininess level, M=2. N=1 is set as an initial value of a counter N. If there are no screens over the graininess level, a discrimination result of step 1115 is NO and the processing routine is finished. If YES in step 1115, step 1116 follows and whether or not the screen setting is immediately updated is confirmed. If NO in step 1116, the processing routine is finished. If YES in step 1116, step 1104 follows. In the subsequent processes, since there are two screens of the first and third screens over the graininess level, the page of the error diffusion for copying and the two pages of the small number of lines for printing are sequentially confirmed. First, the error diffusion for copying is performed as the first screen and the graininess is measured as mentioned above. Since the screen is the first screen, the processing routine is returned to step 1104. The screen setting of the small number of lines for printing is performed as the second screen. It is confirmed in step 1113 that the two screens were finished, and the processing routine is finished.

As described above, according to the second embodiment, merely by making the auto tone correction provided hitherto, the screen can be automatically selected in consideration of the graininess in the screen of each mode and the screen setting serving as a halftone processing parameter can be changed in consideration of the graininess without separately executing the operation for the graininess.

Further, the measurement of the graininess can be also shortened by measuring one color upon selection of the color screen. Although the screen setting as a halftone processing parameter has been performed to cyan here, naturally, the same advantage will be also obtained in the case of magenta. In the event that the measurement of the graininess is performed by measuring yellow or black as the one color, even if the setting 3 depicted in FIG. 17 is changed to the setting 2, for example, the number of lines and the angle remain unchanged because the setting contents of the settings 2 and 3 are identical in yellow or black as shown in FIG. 17. For this reason, parameters cannot be changed when yellow or black is selected as the one color. Therefore, it is desirable to select cyan or magenta as the one color.

Third Embodiment

Although the first and second embodiments have been described with respect to the case of the auto tone correction in color, the third embodiment will be described with respect to a case of the auto tone correction in monochrome with reference to FIG. 13.

Figure 14:
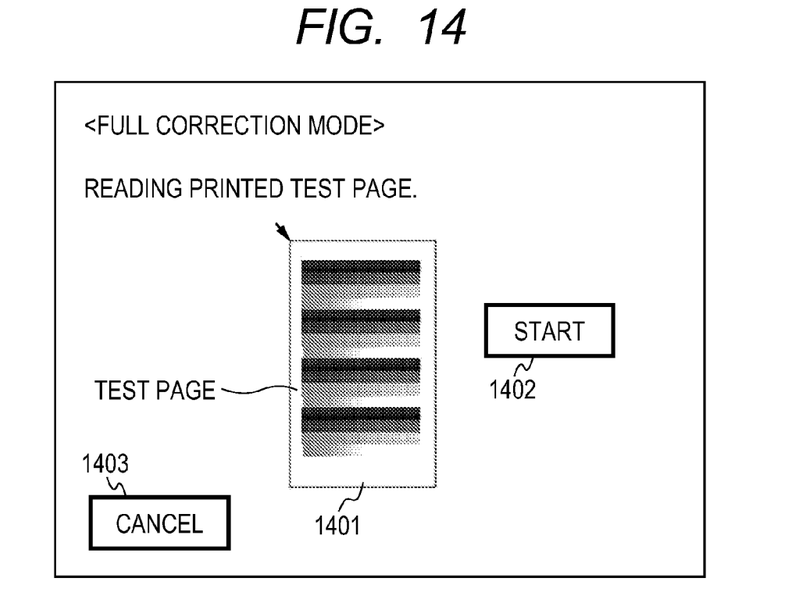
FIG. 14 is an operation display screen of an operating unit in the third embodiment.

Although the cyan, magenta, yellow, and black patches are printed upon printing of one test page in color as illustrated in FIG. 8, in the case of monochrome, a printing in which the halftone processing parameter has been changed can be performed by printing of one page as illustrated in FIG. 14. Therefore, the granularities of a plurality of screens can be measured by reading one page once.

Figure 13:
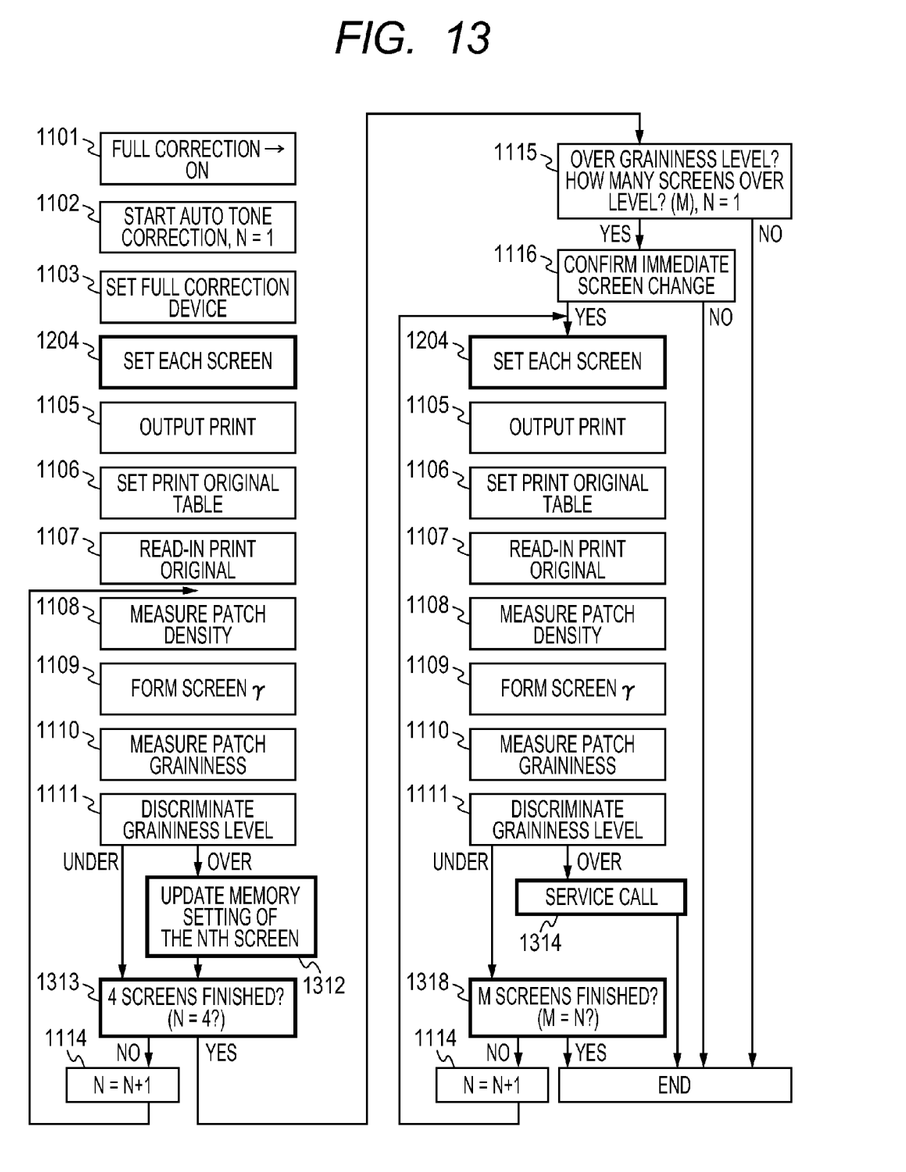
FIG. 13 is a flowchart in the third embodiment.
Figure 15:
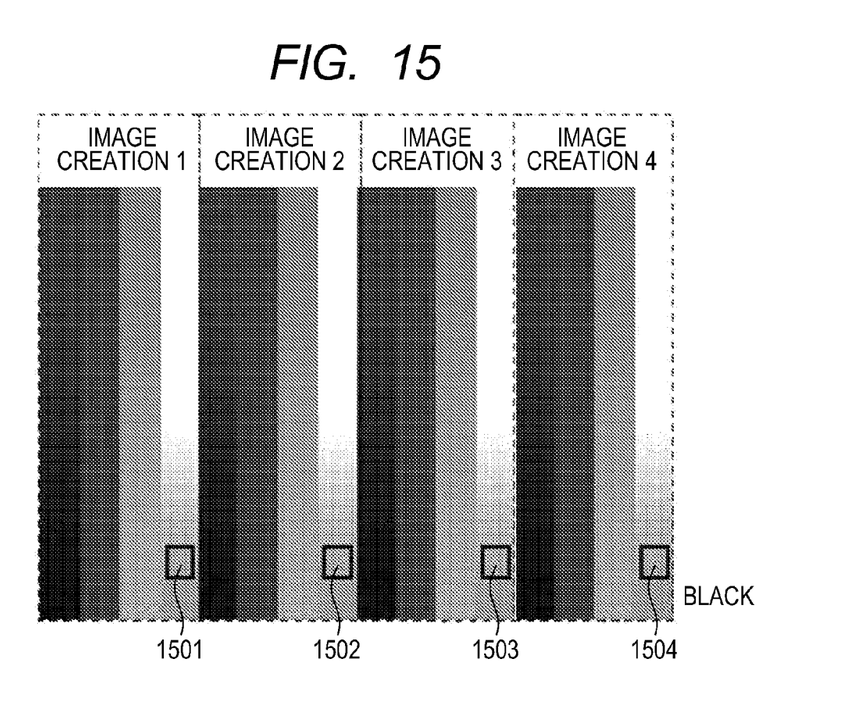
FIG. 15 is a chart illustrating an image creation in the third embodiment.
Figure 16A:
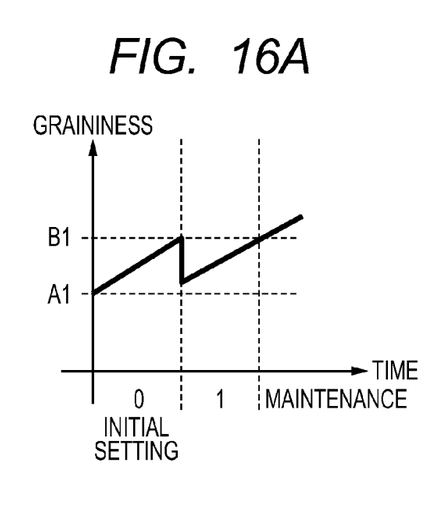
FIGS. 16A, 16B, 16C and 16D are diagrams for discriminating graininess in the third embodiment.
Figure 16B:
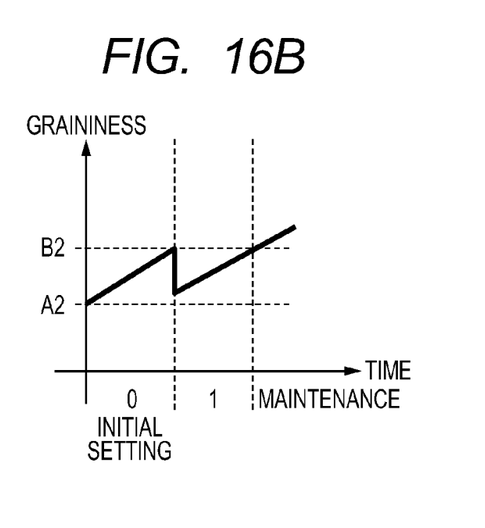
Figure 16C:
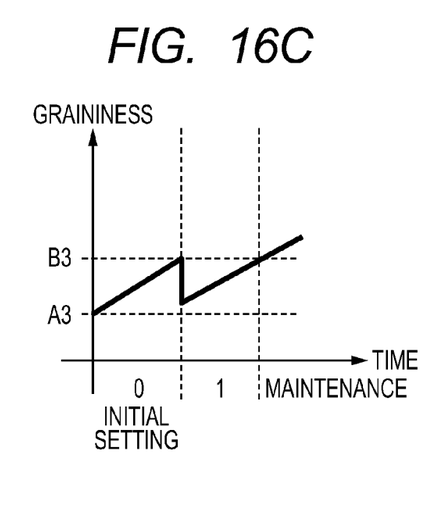
Figure 16D:
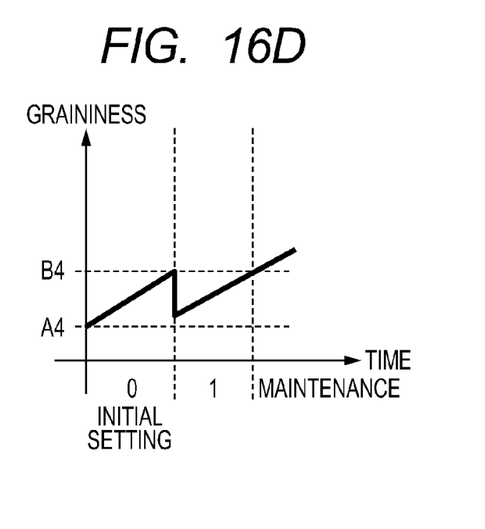

That is, in step 1312 in FIG. 13, an image creation 1 in FIG. 15 is performed as the first screen, an image creation 2 is performed as the second screen, an image creation 3 is performed as the third screen, and an image creation 4 is performed as the fourth screen, respectively. In step 1111 in FIG. 13, in the first screen, as illustrated in FIG. 16A, whether or not the graininess exceeds the predetermined reference level B1 is confirmed. In the second screen, as illustrated in FIG. 16B, whether or not the graininess exceeds the predetermined reference level B2 is confirmed. In the third screen, as illustrated in FIG. 16C, whether or not the graininess exceeds the predetermined reference level B3 is confirmed. In the fourth screen, as illustrated in FIG. 16D, whether or not the graininess exceeds a predetermined reference level B4 is confirmed. In accordance with a result of each confirmation, the screen settings are updated in step 1312 as described in the first and second embodiments. Since there are four kinds of image creation in this case, whether or not the four screens have been finished is confirmed in step 1313. If NO in step 1313, the processes are repeated until they are finished. If the four screens have been finished (YES), step 1115 follows. In step 1115, whether or not the screens over the graininess level exist is discriminated and how many screens over the graininess level is confirmed. If there are no screens over the graininess level (NO), the processing routine is finished.

If the screens over the graininess level exist (YES), since it is sufficient to use one page in the case of monochrome, the setting of each screen is made once again in step 1204 and one page is output. At this time, the graininess level of only the image creation portion over the graininess level in step 1115 is discriminated in step 1111. If necessary, the memory setting is updated. Whether or not the necessary image creation of M screens has been finished is confirmed in step 1318. If YES, the processing routine is finished.

In the third embodiment, as an image creation of monochrome, the setting of the graininess 0 of the image creation 1 is made by the multilevel error diffusion, the setting of the graininess 1 is made by the binary error diffusion, and the initial setting is made by the multilevel error diffusion. Upon setting of the graininess 0 of the image creation 2, the process is executed by the screen setting having characteristics in which the number of lines per inch is equal to 283 and a screen angle is equal to 45°, and the image creation is performed. Upon setting of the graininess 1, the process is executed by the screen setting having characteristics in which the number of lines per inch is equal to 212 and a screen angle is equal to 45°. Upon initial setting, the process is executed by the screen setting having characteristics in which the number of lines per inch is equal to 283 and a screen angle is equal to 45°. Similarly, upon setting of the graininess 0 of the image creation 3, the process is executed by the screen setting having characteristics in which the number of lines per inch is equal to 170 and a screen angle is equal to 45°. Upon setting of the graininess 1, the process is executed by the screen setting having characteristics in which the number of lines per inch is equal to 141 and a screen angle is equal to 45°. Upon initial setting, the process is executed by the screen setting having characteristics in which the number of lines per inch is equal to 170 and a screen angle is equal to 45°. Upon setting of the graininess 0 of the image creation 4, the process is executed by the screen setting having characteristics in which the number of lines per inch is equal to 121 and a screen angle is equal to 45°. Upon setting of the graininess 1, the process is executed by the screen setting having characteristics in which the number of lines per inch is equal to 106 and a screen angle is equal to 45°. Upon initial setting, the process is executed by the screen setting having characteristics in which the number of lines per inch is equal to 121 and a screen angle is equal to 45°. Naturally, a similar advantage will be obtained in the case of any other number of screens and any other angle so long as the number of lines of the graininess 1 is smaller than that of the graininess 0. If the number of lines is reduced, even if the engine is granular, the dots are concentrated and the graininess can be improved.

As described above, according to the third embodiment, merely by making the auto tone correction provided hitherto, the screen can be automatically selected in consideration of the graininess in the screen of each image creation and the screen can be changed in consideration of the graininess without separately executing the operation for the graininess.

Fourth Embodiment

Although the predetermined screen setting has been made in the first, second, and third embodiment, a case where the number of lines is automatically changed will now be described.

Figure 19:
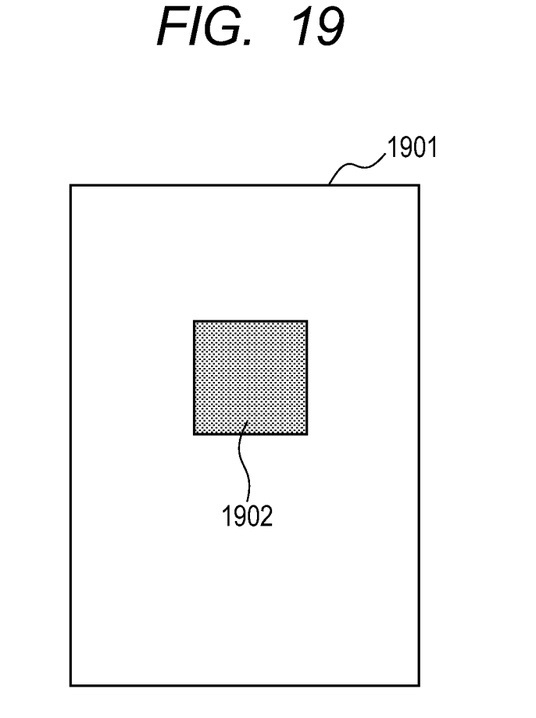
FIG. 19 is a diagram illustrating an example of a test page.

A test page 1901 illustrated in FIG. 19 is screen halftone processed and output. Graininess in a patch portion 1902 is measured. In accordance with the measured graininess level, the number of lines of the screen corresponding to it is selected as illustrated in FIG. 17, so that the same graininess can be always maintained. When the graininess is very low, the large number of lines of the screen is used. On the contrary, when the graininess is very high, by stably printing by the small number of lines of the screen, an output in which the graininess does not change even if maintenance is not performed can be performed. When the graininess deteriorates by a certain level or more, the maintenance is performed, the graininess is improved, and the screen setting that is optimum to the printer can be determined by measuring the test page of FIG. 19.

Consequently, the screen of the graininess that is optimum to the printer can be automatically set.

Other Embodiments

The invention is also realized by executing the following processes. That is, software (program) for realizing the functions of the embodiments mentioned above is supplied to a system or an apparatus through a network or various kinds of storage media and a computer (or a CPU or MPU) of the system or apparatus reads out the program and executes processes based on the program.

Consequently, merely by making the auto tone correction provided hitherto, the screen can be automatically selected in consideration of the graininess and the screen can be changed in consideration of the graininess without separately executing the operation for the graininess.

Even if a mode for automatically changing the screen has been set, when the user wants to immediately change the screen, he can change it.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-114518, filed May 18, 2010, which is hereby incorporated by reference herein in its entirety.

What is claimed is:

1. An image processing apparatus comprising:
a print unit configured to execute a halftone process on a test image for tone correction and print the processed test image;
a forming unit configured to form a tone correction table in accordance with read values from the printed test image;
a calculating unit configured to obtain graininess from a read value of a low density portion of a tone correction patch of the test image for the tone correction;
a discriminating unit configured to discriminate whether the obtained graininess exceeds a predetermined reference level;
a setting change unit configured to change a setting of the halftone process so as to reduce the graininess when said discriminating unit discriminates that the obtained graininess exceeds the predetermined reference level; and
an instruction unit configured to provide an instruction for immediately making effective the setting of the halftone process changed by said setting change unit,
wherein, when said instruction unit does not provide the instruction, said forming unit uses the test image on which the halftone process is executed with the setting changed by said setting change unit, upon next forming the tone correction table.

2. The apparatus according to claim 1, wherein
the test image has yellow, magenta, and cyan test images, and
said discriminating unit discriminates the graininess by using the graininess of cyan or magenta without using the graininess with respect to yellow.

3. The apparatus according to claim 2, wherein
the test image further has a black test image, and
with respect to black, said discriminating unit obtains the graininess of the black test image and makes the discrimination.

4. An image processing method comprising:
executing a halftone process on a test image for tone correction and printing the processed test image;
forming a tone correction table in accordance with read values from the printed test image;
obtaining graininess from a read value of a low density portion of a tone correction patch of the test image for the tone correction;
discriminating whether the obtained graininess exceeds a predetermined reference level;
changing a setting of the halftone process so as to reduce the graininess when it is discriminated that the obtained graininess exceeds the predetermined reference level; and
providing an instruction for immediately making effective the changed setting of the halftone process,
wherein, when the instruction is not provided in said providing, said forming uses the test image on which the halftone process is executed with the changed setting, upon next forming the tone correction table.

5. The method according to claim 4, wherein
the test image has yellow, magenta, and cyan test images, and
said discriminating discriminates the graininess by using the graininess of cyan or magenta without using the graininess with respect to yellow.

6. The method according to claim 5, wherein
the test image further has a black test image, and
with respect to black, said discriminating obtains the graininess of the black test image and makes the discrimination.

7. A non-transitory computer-readable storage medium storing a computer-executable program for causing a computer to execute an image processing method, the method comprising:
executing a halftone process on a test image for tone correction and printing the processed test image;
forming a tone correction table in accordance with read values from the printed test image;
obtaining graininess from a read value of a low density portion of a tone correction patch of the test image for the tone correction;
discriminating whether the obtained graininess exceeds a predetermined reference level; and
changing a setting of the halftone process so as to reduce the graininess when it is discriminated that the obtained graininess exceeds the predetermined reference level; and
providing an instruction for immediately making effective the changed setting of the halftone process,
wherein, when the instruction is not provided by said providing, the forming uses the test image on which the halftone process is executed with the changed setting, upon next forming the tone correction table.

8. The apparatus according to claim 1, wherein, when said instruction unit provides the instruction, said calculating unit obtains graininess from a read value of a low density portion of a tone correction patch of the test image on which the halftone process is executed with the changed setting and which is printed, and wherein, when said discriminating unit again discriminates that the obtained graininess exceeds the predetermined reference level, a service call is made.

9. The method according to claim 4, wherein, when the instruction is provided in said providing, said obtaining obtains graininess from a read value of a low density portion of a tone correction patch of the test image on which the halftone process is executed with the changed setting and which is printed, and wherein, when said discriminating again discriminates that the obtained graininess exceeds the predetermined reference level, a service call is made.

* * * * *